May 11, 1926.

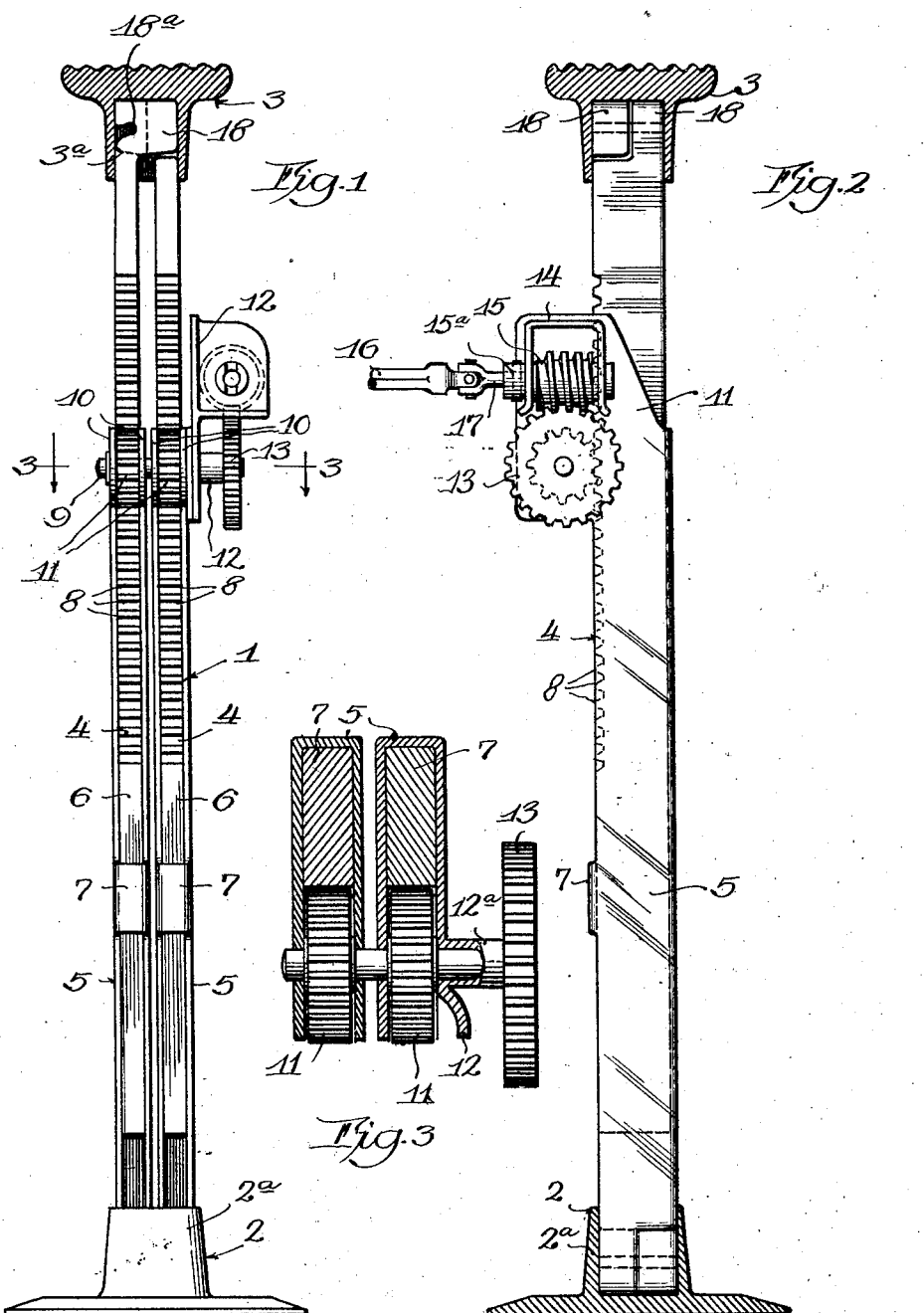

M. GELDER

AUTOMOBILE JACK AND RIM TOOL

Filed Sept. 16, 1925  2 Sheets-Sheet 2

1,584,087

Inventor,
Mark Gelder

Patented May 11, 1926.

1,584,087

UNITED STATES PATENT OFFICE.

MARK GELDER, OF CHICAGO, ILLINOIS.

AUTOMOBILE JACK AND RIM TOOL.

Application filed September 16, 1925. Serial No. 56,605.

This invention relates to improvements in automobile jacks and rim tool, and more particularly to a combined tool which may be utilized either as a jack or as a tool to be used in spreading or contracting tire rims in making tire changes or repairs.

The object of the invention is to provide a portable tool which may be carried as a part of the automobile equipment and serving to perform either of the above mentioned functions with the advantage of combining two tools in one.

The preferred embodiment of the invention is disclosed in the accompanying drawings, in which—

Figure 1 is a view in front elevation of a tool as assembled for use as a jack.

Figure 2 is a view in side elevation of the tool as used as a jack.

Figure 3 is an enlarged detail view in cross section taken on line 3—3 of Figure 1.

Figure 4:
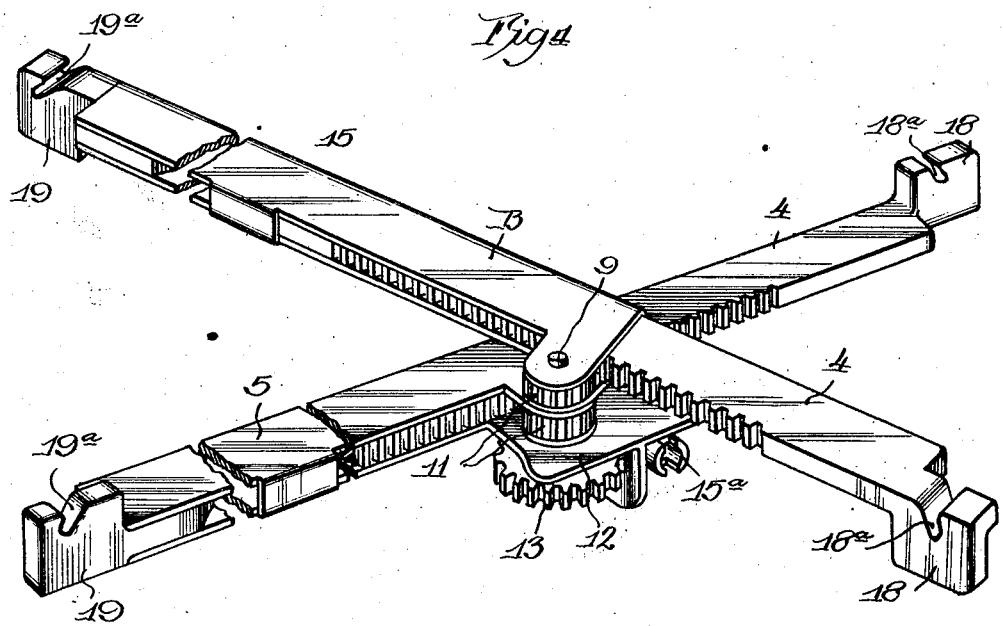
Figure 4 is a perspective view of the tool showing its use as a rim spreading device.

In common with lifting devices, the tool of the present disclosure when used as a jack consists of a pedestal 1 having a foot 2 at its lower end adapted to rest upon the ground and a step 3 at its upper end designed to engage under the axle or other part of the vehicle to be lifted. The pedestal 1 consists of two extensible members 4—4 identical in construction and each consisting of a relatively stationary channel member 5, in which a bar 6 slides or telescopes. If desired, these members which are shown as channel members may be tubular throughout a portion of their entire length, as shown at 7—7.

The extensible bars 6—6 project upwardly beyond the ends of the channel members 5—5 and are provided along one edge with rack teeth 8. At the upper ends of the channel bars 5—5 is the rack bar elevating mechanism consisting of a shaft 9 extending transversely of the face of the rack teeth and journaled in pairs of flanges 10—10 projecting laterally from the upper ends of the channel members 5—5. Keyed to the shaft 9 between the pairs of flanges 10—10 are pinions 11—11 meshing with the rack teeth 8 of the bars 6—6. Fixed to the outer face of one of the channel members (to the right as shown in Figure 1) is a vertical plate 12 provided near its lower end with a shaft bearing $12^a$ for the adjacent end of the shaft 9, to which is fixed a worm wheel 13. Integral with the upper portion of the plate 12 is an inverted U-shaped yoke 14 in which is journaled a worm 15 meshing with the worm wheel 13. Connected with the shaft $15^a$ of the worm 15 is an operating handle 16 having a universal or swivel joint connection 17, insertable in a tongue and groove socket in the end of the worm shaft $15^a$.

The upper ends of the rack bars 6—6 are provided with laterally extending flanges 18—18, which overlap each other and nest together so that the two rack bars present a solid end construction. Formed in the corresponding edges of each flange 18 is a notch $18^a$, said notches registering with each other when the bars are brought together side by side. Fitting over the flanged upper ends of the bars is the step 3 provided with a socket $3^a$ into which the upper ends of the bars are inserted.

At the lower ends of the channel bars 5—5, a similar arrangement is found wherein a flanged block 19—19, as clearly shown in Figure 4, is fitted into the end of each channel member 5, said blocks having laterally extending and interfitting faces so that when the two channel bars are side by side the two blocks fit together to form a solid rectangular base which fits into an upstanding socket portion $2^a$ of the foot 2. As before, notches $19^a$—$19^a$ are formed in the side edges of the blocks 19—19, these notches not only being located in the same relative positions in the same side edges of the blocks but corresponding in position to the notches $18^a$—$18^a$ at the upper ends of the rack bars 6—6.

When the tool is used as a jack, the channel members 5—5 and the rack bars 4—4 occupy vertical positions, side by side, as clearly shown in Figure 1, the upper and lower ends thereof being fitted into the foot 2 and step 3, respectively. Thus by inserting the jack in upright position underneath the vehicle and rotating the handle 16, the rack bars 6—6 are elevated or extended upwardly in the channel members by the power transmitted through the worm 15 and worm wheel 13, to the shaft 9 and thence to the rack bars through the pinions 11, the telescopic movement of the bars within the relatively fixed channel members 5 serving to raise or lower the vehicle in the usual manner.

Figure 5:
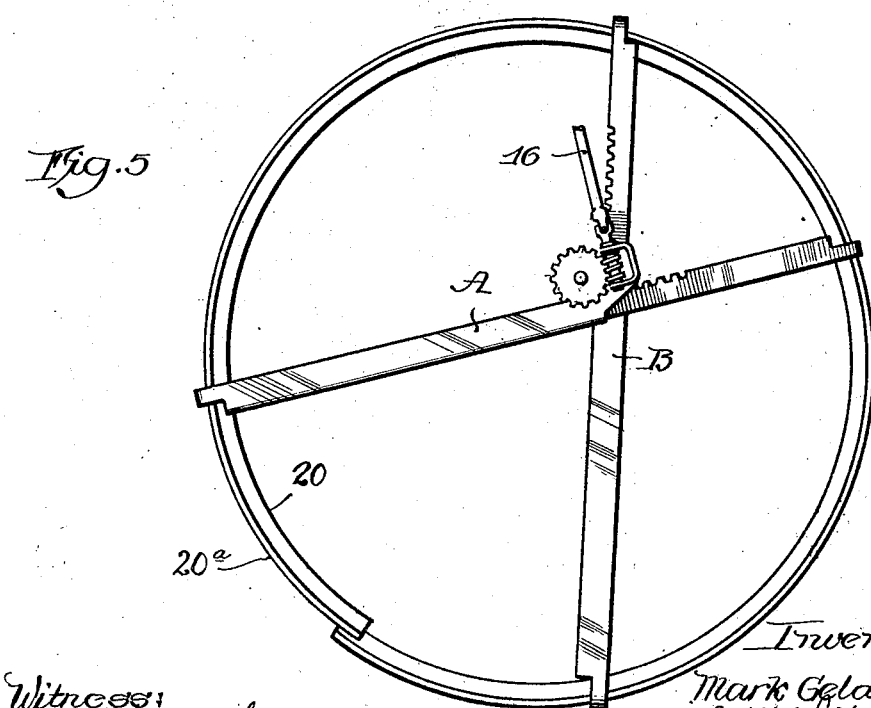
Figure 5 is a view in elevation showing the manner of applying the tool to a tire rim.

Figures 4 and 5 show the tool as used for spreading a metal rim 20 which carries the vehicle tire. By removing the foot 2 and step 3, the pair of telescoping rack and channel bars may be swung about the axis of the shaft 9 to any desired angle. By thus swinging the bars to the position shown in Figure 4, for instance, the opposite end of each member presents hook extremities by virtue of the notches 18ª and 19ª. These notches face in the same direction so that by placing the tool upon the rim with the notches toward said rim, the two expansible arms may be shortened or lengthened so that the hooks may engage the laterally projecting flange 20ª which surrounds the periphery of the rim. Assuming then that it is desired to contract the ring so as to remove the tire, the tool is applied and by rotating the handle 16 in a direction to shorten the arms, the pressure is applied so that the rim is sprung at its joint and thus contracted so that it may be demounted from the tire. Likewise, when the tire and rim are to be assembled, the tool is applied and the rim contracted to permit the tire to be placed on the rim and then by manipulating the tool, the rim is expanded so that the proper connection can be made at the rim joint.

Manifestly the construction herein disclosed may be variously modified without departing from the spirit of the invention, and therefore I do not wish to be limited except in so far as specified in the appended claims.

I claim as my invention:

1. In a tool of the character described, the combination of a pair of relatively fixed supporting members, an endwise extensible member located in one of said relatively fixed supporting members, means for pivotally connecting said relatively fixed members to swing about a common axis and in parallel planes, means for extending said extensible member, rim engaging members at the ends of said supporting members and said extensible member, and a detachable foot member adapted to be applied over the free ends of said supporting members.

2. In a tool of the character described, the combination of a pair of endwise extensible members, means for pivotally connecting said members intermediate their ends for relative swinging movement about a common axis and in parallel planes, said members having rim engaging extremities, and a detachable foot and step member provided with sockets adapted to receive the opposite extremities of said extensible members.

3. In a tool of the character described, the combination of a pair of relatively fixed supporting members, pivotally connected adjacent one end, extensible members located in said supporting members, and means for extending said pair of supporting and extensible members, and detachable foot and step members adapted to be applied at opposite ends of said members.

4. In a tool of the character described, the combination of a pair of endwise extensible members, means for pivotally connecting said members intermediate their ends for relative swinging movement about a common axis and in parallel planes, and a detachable foot and step member provided with sockets adapted to receive the opposite extremities of said extensible members.

5. In a tool of the character described, the combination of a pair of extensible members, pivotally connected together for relatively swinging movement about a common axis, a separate rack and pinion acting through a single shaft, to extend said members simultaneously, rim engaging members at the opposite ends of said extensible members, and detachable foot and step members for said extensible members when in parallel position.

Signed at Chicago, Ill. this 3rd day of Sept. 1925.

MARK GELDER.